(No Model.)
J. S. MAXWELL.
GATE HINGE.
No. 547,559. Patented Oct. 8, 1895.
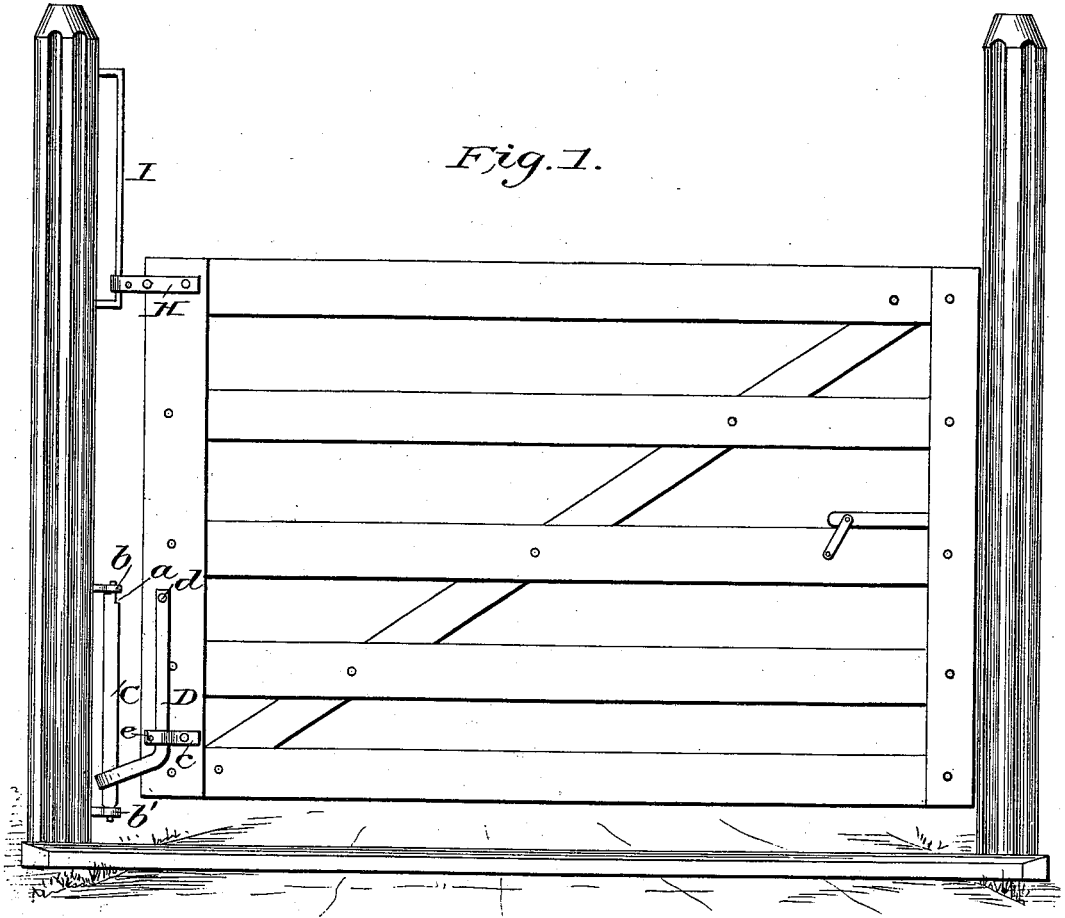
Witnesses.
H. E. Jewell.
W. S. Hazlton.
Inventor.
John S. Maxwell.

UNITED STATES PATENT OFFICE.

JOHN S. MAXWELL, OF WORTHINGTON, INDIANA.

GATE-HINGE.

SPECIFICATION forming part of Letters Patent No. 547,559, dated October 8, 1895.

Application filed May 15, 1895. Serial No. 549,453. (No model.)

*To all whom it may concern:*

Be it known that I, JOHN S. MAXWELL, a citizen of the United States, residing at Worthington, in the county of Greene and State of Indiana, have invented a new and useful Improvement in Gate-Hinges, of which the following is a specification.

My invention relates to that class of gate-hinges in which the gate has straps projecting therefrom and is vertically adjustable on a bar pivoted to the post; and the objects of my invention are, first, to render it unnecessary to raise the gate to any certain point, as when a notched bar is used, and, second, to simplify and lessen the cost of making. I obtain these objects by the mechanism illustrated in the accompanying drawings, in which—

Figure 1 is a side view of the gate and hinges as they appear when let down. Fig. 2 is a top view of the eye $b$, showing the notch which permits the bar C to be raised out when the gate is turned around. Fig. 3 is a top view of the bent bar D, showing the loop which operates on the bar C. Fig. 4 is an edge view of the shouldered arm $c$. Fig. 5 is an edge view of the strap H, showing the hook and key.

The bar C is pivoted to the post by the eyes $b\ b'$, which are driven into the post. This bar has a shoulder $a$, and the eye $b$ has a corresponding notch, which allows the bar to be lifted out when the gate is turned. The bar D is pivoted to the gate at $d$ and is supported at its bend by the shouldered arm $c$, having the key $e$, which is inserted to lock the gate-hinge when the gate is adjusted. The strap H has a hook on its end which bears on the rod I, and has the key $i$, which prevents its coming unhooked.

When it is desired to adjust the gate, the key $e$ is first withdrawn, then the outer end of the gate is raised, which draws the upper end of the bar D outward, thereby releasing its clutch on the bar C, when the gate is adjusted as desired. When the gate is adjusted, the outer end is lowered to a horizontal position, which causes the bar D to clutch the bar C, when the key is again inserted and securely locks the hinge.

I am aware that prior to my invention gate-hinges have been made with a bar pivoted to the post to swing laterally for the purpose of vertical adjustment. I therefore do not claim such a combination broadly; but What I do claim as my invention, and desire to secure by Letters Patent, is—

The combination, with the post and smooth bar C pivoted thereto to swing laterally, of a gate, a bent bar D pivoted thereto and projecting therefrom, having a loop in the projection thereof, operating as a clutch on the bar C, and a guide strap $c$ secured to the gate, through which the bar D passes, and a key $e$, inserted in the perforation of said strap, to lock the gate in its adjusted position, as and for the purpose specified.

JOHN S. MAXWELL.

Witnesses:
JAMES A. MINICH,
IBBIE CARTER.